United States Patent
Weaver et al.

(10) Patent No.: US 9,832,353 B2
(45) Date of Patent: Nov. 28, 2017

(54) METHODS FOR ENCODING, DECODING AND INTERPRETING AUXILIARY DATA IN MEDIA SIGNALS

(71) Applicant: Digimarc Corporation, Beaverton, OR (US)

(72) Inventors: Matthew M. Weaver, Portland, OR (US); Ravi K. Sharma, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 137 days.

(21) Appl. No.: 14/611,515

(22) Filed: Feb. 2, 2015

(65) Prior Publication Data

US 2015/0302543 A1 Oct. 22, 2015

Related U.S. Application Data

(60) Provisional application No. 61/934,425, filed on Jan. 31, 2014.

(51) Int. Cl.
*G06F 21/16* (2013.01)
*H04N 5/225* (2006.01)
(Continued)

(52) U.S. Cl.
CPC ............ *H04N 5/225* (2013.01); *G06F 21/16* (2013.01); *G09C 5/00* (2013.01);
(Continued)

(58) Field of Classification Search
CPC ................ H04N 21/8358; G06T 2201/0065
See application file for complete search history.

(56) References Cited

U.S. PATENT DOCUMENTS 5,862,260 A  1/1999  Rhoads
6,081,907 A  6/2000  Witty et al.
(Continued)

FOREIGN PATENT DOCUMENTS

WO   WO 2012004626   1/2012
WO   WO 2012156774   11/2012

OTHER PUBLICATIONS

Le et al, "Building High-Level Features Using Large Scale Unsupervised Learning," arXiv preprint arXiv:1112.6209 (2011).
(Continued)

*Primary Examiner* — Chan Park
*Assistant Examiner* — Mai Tran
(74) *Attorney, Agent, or Firm* — Digimarc Corporation

(57) ABSTRACT

The disclosure relates to digital watermarking, steganography, and specifically to message coding protocols used in conjunction with digital watermarking and steganographic encoding/decoding and payload interpretation methods. One claim recites a method for interpreting a data structure having fixed and variable message portions, the method comprising: processing the fixed message portion to determine a version of the variable message portion; decoding the entire payload field of the variable message portion according to the determined version; and interpreting only a portion of the decoded payload field according to the determined version. Of course, other features and claims are provided too.

22 Claims, 3 Drawing Sheets

(51) Int. Cl.
*H04N 21/2389* (2011.01)
*H04N 21/44* (2011.01)
*H04N 21/8358* (2011.01)
*G09C 5/00* (2006.01)

(52) U.S. Cl.
CPC . *H04N 21/23892* (2013.01); *H04N 21/44008* (2013.01); *H04N 21/8358* (2013.01); *H04L 2209/34* (2013.01); *H04L 2209/608* (2013.01)

(56) References Cited

U.S. PATENT DOCUMENTS

| | | | |
|---|---|---|---|
| 6,122,403 | A | 9/2000 | Rhoads |
| 6,557,103 | B1 | 4/2003 | Boncelet |
| 6,590,996 | B1 | 7/2003 | Reed et al. |
| 6,614,914 | B1 | 9/2003 | Rhoads et al. |
| 6,947,571 | B1 | 9/2005 | Rhoads et al. |
| 7,206,820 | B1 | 4/2007 | Rhoads |
| 7,227,972 | B2 | 6/2007 | Brundage et al. |
| 7,397,607 | B2 | 7/2008 | Travers |
| 7,412,072 | B2 | 8/2008 | Sharma et al. |
| 7,778,442 | B2 | 8/2010 | Sharma et al. |
| 8,094,877 | B2 | 1/2012 | Sharma et al. |
| 8,868,039 | B2 | 10/2014 | Rodriguez |
| 9,325,819 | B2 | 4/2016 | Sharma et al. |
| 9,380,186 | B2 | 6/2016 | Reed et al. |
| 9,449,357 | B1 | 9/2016 | Lyons et al. |
| 2004/0064586 | A1* | 4/2004 | Weigand ........... H04L 29/12377 709/246 |
| 2005/0138648 | A1* | 6/2005 | Ahmed ..................... G06F 9/54 719/328 |
| 2005/0195128 | A1 | 9/2005 | Sefton |
| 2005/0262351 | A1* | 11/2005 | Levy ................... G06Q 20/401 713/176 |
| 2006/0104598 | A1 | 5/2006 | Gilles et al. |
| 2007/0156726 | A1 | 7/2007 | Levy et al. |
| 2009/0244097 | A1 | 10/2009 | Estevez |
| 2009/0282025 | A1 | 11/2009 | Winter et al. |
| 2009/0285492 | A1 | 11/2009 | Ramanujapuram et al. |
| 2009/0322671 | A1 | 12/2009 | Scott et al. |
| 2010/0017614 | A1* | 1/2010 | Russell ................. G06T 1/0085 713/176 |
| 2010/0045869 | A1 | 2/2010 | Baseley et al. |
| 2010/0150434 | A1 | 6/2010 | Reed |
| 2010/0211794 | A1 | 8/2010 | Bilobrov |
| 2010/0228632 | A1 | 9/2010 | Rodriguez |
| 2011/0125735 | A1 | 5/2011 | Petrou |
| 2011/0161076 | A1 | 6/2011 | Davis et al. |
| 2011/0212717 | A1 | 9/2011 | Rhoads et al. |
| 2011/0214044 | A1 | 9/2011 | Rhoads |
| 2011/0264700 | A1 | 10/2011 | Mei et al. |
| 2011/0274310 | A1 | 11/2011 | Rhoads |
| 2011/0289532 | A1 | 11/2011 | Yu et al. |
| 2012/0008821 | A1 | 1/2012 | Sharon et al. |
| 2012/0046071 | A1 | 2/2012 | Brandis et al. |
| 2012/0214515 | A1 | 8/2012 | Davis et al. |
| 2012/0218444 | A1 | 8/2012 | Stach |
| 2012/0224743 | A1 | 9/2012 | Rodriguez et al. |
| 2012/0284012 | A1 | 11/2012 | Rodriguez et al. |
| 2012/0300974 | A1 | 11/2012 | Rodriguez |
| 2013/0097630 | A1 | 4/2013 | Rodriguez |
| 2013/0311329 | A1 | 11/2013 | Knudson et al. |
| 2013/0314541 | A1 | 11/2013 | Lord et al. |
| 2014/0015964 | A1* | 1/2014 | Chew .................... H04N 5/232 348/143 |
| 2014/0052555 | A1 | 2/2014 | MacIntosh et al. |
| 2014/0164124 | A1 | 6/2014 | Rhoads |
| 2014/0258110 | A1 | 9/2014 | Davis et al. |
| 2015/0016664 | A1 | 1/2015 | Rodriguez |
| 2015/0016712 | A1 | 1/2015 | Rhoads et al. |
| 2015/0055855 | A1 | 2/2015 | Rodriguez et al. |

OTHER PUBLICATIONS

Coates et al, "Deep Learning with COTS HPC Systems," Proceedings of the 30th International Conference on Machine Learning (ICML-13), 2013.

Neven et al, "Image Recognition with an Adiabatic Quantum Computer I. Mapping to Quadratic Unconstrained Binary Optimization," Arxiv preprint arXiv:0804.4457, 2008.

Nowak, et al, Sampling strategies for bag-of-features image classification, Computer Vision—ECCV 2006, Springer Berlin Heidelberg, pp. 490-503.

Fei-Fei et al, A Bayesian Hierarchical Model for Learning Natural Scene Categories, IEEE Conference on Computer Vision and Pattern Recognition, 2005.

U.S. Appl. No. 61/934,425, filed Jan. 31, 2014 (priority document for this application).

* cited by examiner

METHODS FOR ENCODING, DECODING AND INTERPRETING AUXILIARY DATA IN MEDIA SIGNALS

RELATED APPLICATION DATA

This application claims the benefit of U.S. Provisional Application No. 61/934,425, filed Jan. 31, 2014, which is hereby incorporated herein by reference in its entirety.

TECHNICAL FIELD

The disclosure relates to digital watermarking, steganography, and specifically to message coding protocols used in conjunction with digital watermarking and steganographic encoding/decoding and payload interpretation methods.

BACKGROUND

Digital watermarking is a process for modifying a host signal (e.g., a physical, electronic or electromagnetic signal) to embed a hidden, machine-readable code. The host signal may be modified such that the embedded code is imperceptible or nearly imperceptible to a human, yet may be detected through an automated detection process. Most commonly, digital watermarking is applied to media such as still images, audio, and video. However, it may also be applied to other types of media, including documents (e.g., through line, word or character shifting), software, multi-dimensional graphics models, and surface textures of objects. Steganography is related field of study pertaining to encoding and decoding of hidden auxiliary data signals, such that the auxiliary data is not discernable by a human.

Digital watermarking systems typically have two primary components: an encoder that embeds the digital watermark (also referred to herein simply as a "watermark") in a host signal conveyed by the media (also referred to as a "host media signal"), and a decoder that detects and reads the embedded watermark from a signal suspected of containing a watermark (i.e., a "suspect signal"). The encoder embeds a watermark by subtly altering the host media signal. The decoder analyzes a suspect signal to detect whether a watermark is present. In applications where the watermark encodes information (i.e., a "payload"), the decoder decodes this information from the detected watermark and interprets the decoded information.

The format, syntax, semantics and/or length of message payloads associated with two different watermarks can be different. Thus, one practical challenge in the deployment of digital watermarking systems is the potential inability to accurately interpret what the payload, once decoded from the watermark, represents. For example suppose a payload, once decoded, is "112328324721". Without more, it is difficult to accurately determine what "112328324721" represents. One potential solution would be to eliminate the interpretation function at the decoder, and instead provide the payload as a pointer, index, or other link that a decoder in the field can simply transmit (e.g., wirelessly, via Wi-Fi, etc.) to a remote network database where the specific payload associated with the indirect link can be retrieved. Thus, to continue with the example given above, the decoder may transmit the decoded link to a remote network database, and the payload associated with the transmitted link can be retrieved as a payload representing lottery numbers associated with a lottery jackpot game (e.g., POWERBALL).

The disclosure provides variable message payload methods. One aspect of the disclosure is a message payload method for creating a data structure (e.g., a digital watermark, etc.). This method forms a payload item identifier in a first portion of a payload field that identifies a payload item conveyed in a second portion of the payload field. The payload item identifier and the payload item are then embedded into a host media signal (e.g., such that the message is substantially imperceptible in the host media signal).

Another aspect of the disclosure is a method for interpreting a data structure having fixed and variable message portions. The method determines a version of the variable message portion and decodes a payload field of the variable message portion according to the determined version. It then determines a payload item identifier in a first portion of a payload field of the decoded variable message portion and interprets a payload item conveyed in a second portion of the decoded payload field according to the determined payload item identifier.

Yet another aspect of the disclosure is a method for interpreting a data structure having fixed and variable message portions. The method determines a version of the variable message portion and decodes only a portion of the payload field of the variable message portion according to the determined version. It then interprets a payload item conveyed in the decoded portion of the payload field.

Still another aspect of the disclosure is a method for interpreting a data structure having fixed and variable message portions. The method determines a version of the variable message portion, decodes the entire payload field of the variable message portion and then interprets only a portion of the decoded payload field according to the determined version.

Further features will become apparent with reference to the following detailed description and accompanying drawings.

DETAILED DESCRIPTION

Figure 1:
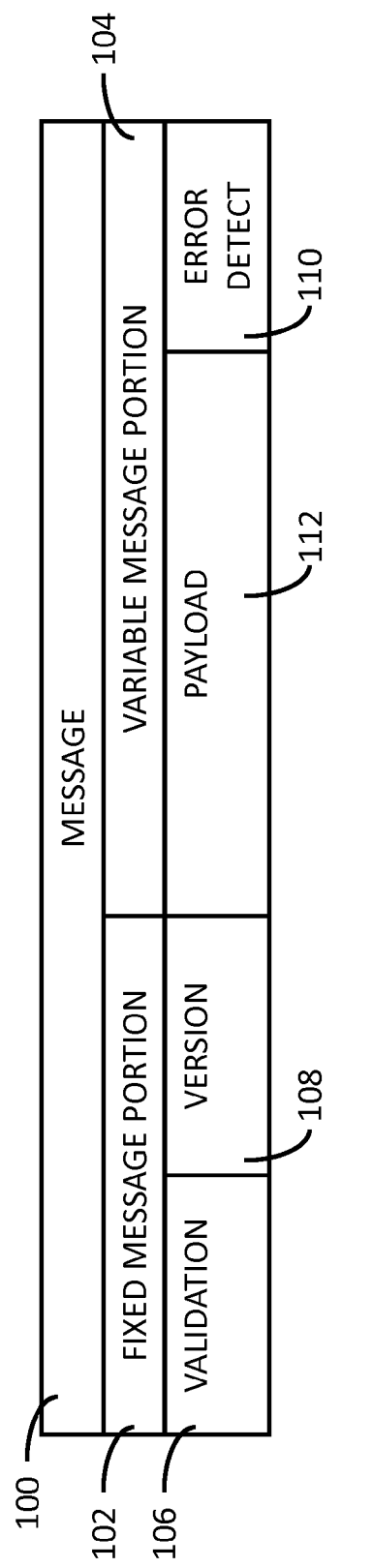
FIG. 1 is a diagram schematically illustrating the composition of fields in a message that may be conveyed by a digital watermark encoded in a host media signal, according to one embodiment.
Figure 2:
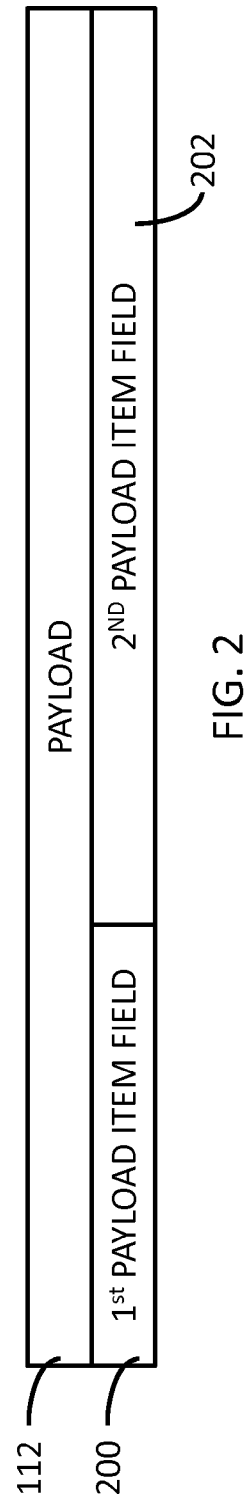
FIG. 2 is a diagram schematically illustrating the composition of the payload field in the message shown in FIG. 1, according to one embodiment.

FIG. 1 is a diagram schematically illustrating the composition of fields in a message that may be conveyed by a digital watermark encoded in a host media signal, according to one embodiment. FIG. 2 is a diagram schematically illustrating the composition of the payload field in the message shown in FIG. 1, according to one embodiment.

Referring to FIG. 1, a message, such as message 100, may be conveyed by a digital watermark encoded in any of a variety of host signals conveyed by media (such as a still image, video, audio, document, software, multi-dimensional graphics model, surface texture of an object, etc.) according to a particular protocol. As used herein, the term "protocol" refers to the particular scheme by which the host media signal is modified to encode the digital watermark. To facilitate detection and reading of the message 100, the digital watermark may also convey a specially designed synchronization signal that is separate from the message 100. In another embodiment, the manner in which the message 100 is conveyed by the digital watermark may, itself, provide the synchronization signal.

As exemplarily illustrated, the message 100 may include a fixed message portion 102 and a variable message portion 104. The fixed message portion 102 includes a validation field 106 and a version field 108. The validation field 106 and version field 108 each have a fixed bit-length and employ a fixed error robustness coding method. The validation field 106 includes a fixed set of known message symbols (also referred to as "false positive symbols") that provide a check to ensure a valid digital watermark is present. The version field 108 includes one or more symbols which can vary so as to form a version identifier indicating the version of the variable message portion 104 to be decoded.

In one embodiment, the version identifier carries one or more version parameters, such as an error correction type identifier (e.g., specifying a type of error correction to be performed, such as block codes, convolution codes, concatenated codes, etc.), a repetition indicator, an error detect indicator, a payload item sub-type indicator, the bit-length of the variable message portion 104 (i.e., the number of bits carried within the variable message portion 104), the bit-length of one or more or all fields within the variable message portion 104, and/or the location of one or more or all fields within the variable message portion 104, or an index that refers to one or more or all of these version parameters. The version identifier included in the version field 108 can be created, selected from among many different existing version identifiers or otherwise set during generation of the message 100. Accordingly, the version field 108 can be associated with a set of version identifiers, wherein one of the version identifiers from the set is carried within the version field 108.

The variable message portion 104 includes an error detect field 110 and a payload field 112. The error detect field 110 has a variable number of error detect symbols such as a certain type and length of Cyclic Redundancy Check (CRC) symbols. Some forms of error correction, such as convolution codes, perform error correction in a manner that depends on subsequent symbols in a series or sequence of symbols. As such, symbols at the end of the sequence are error correction decoded with less confidence because there are fewer or no symbols following them. This attribute of such forms of error correction can be mitigated by repeating certain parts of symbol sequences in the message 100 that are relatively more susceptible to decoding errors. This typically leads to repetition of symbols in the tail of the message 100 (e.g., typically occupied by the error detect field 110) than at the beginning of the message 100.

Symbols (e.g., binary symbols, M-ary symbols, etc.) within the payload field 112 can represent one or more identifiers, one or more computer files, one or more sets of machine-executable instructions, metadata, or any other type of information (also collectively and generically referred to herein simply as the "payload"). Taken individually, an identifier, computer file, machine-executable instruction, metadata, or other type of information is generically referred to herein simply as a "payload item" and, more-narrowly, is referred to as a particular type of payload item (or "payload item type"). Instead of conveying payload items directly, the payload field 112 can convey one or more direct links (e.g., or address, or IP address, etc.) to one or more remote servers where any payload item is stored and can be obtained. Instead of a direct link, the payload field 112 can convey one or more pointers, indexes, or other indirect links to an intermediate database (e.g., accessible on a remote server), from which a destination link to any payload item can be obtained.

In one embodiment, the payload conveyed by the payload field 112 is associated with the host media signal in which the digital watermark is embedded, with media carrying the host signal, or the like or any combination thereof. If the media that carries the host media signal is associated with a particular object, venue, location, event, etc., or if the host media signal is associated with a particular object, venue, event, etc., then the payload can also be associated with the particular object, venue, location, event, etc.

Examples of objects that may be associated with the media described herein (or with host signals conveyed thereby) include containers (e.g., shipping containers, boxes, cartons, cans, bags, cups, bottles, drinking glasses, etc.), consumer packaged goods (CPGs) (e.g., packaged food, beverage, clothing, tobacco, cleaning products, cosmetic items, toothpaste, over-the-counter pharmaceutical or medical items, light bulbs, etc.), stickers, decals, signs, posters, free-standing retail displays, consumer electronic devices (e.g., radios, television sets, digital media players, video recorders, DVD players, digital cameras, camcorders, desktop computers, laptop computers, tablet computers, video game consoles, telephones, mobile phones, smartphones, etc.), household appliances (e.g., air conditioners, dishwashers, clothes dryer, drying cabinet, freezer, refrigerator, kitchen stove, water heater, washing machine, microwave oven, coffee makers, food processors, space heaters, lamps, light bulbs, etc.), textile products (e.g., clothing, bedding, rugs, carpets, sleeping bags, etc.) or the like or any combination thereof. Examples of venues that may be associated with the media described herein (or with host signals conveyed thereby) include concert halls, theatres, convention centers, hotels, retail stores, shopping malls, sports stadiums, zoos, museums, libraries, amusement parks, dance clubs, residences, etc. Likewise, examples of events that may be associated with the media described herein (or with host signals conveyed thereby) include conferences, sports events, parties, festivals, dances, live or pre-recorded performances of movies, plays, musicals, or concerts, broadcasting, streaming, playing or other rendering of media such as television programs, movies, music, rendering or streaming of digital media, parties, festivals, video game, or the like or any combination thereof.

Numerous types of identifiers may be conveyed by the payload field 112 (or linked to via the payload field 112). Some examples of different types of identifiers that may be conveyed (or linked to) include an international standard book number (ISBN), an international mobile subscriber identity (IMSI), an international mobile equipment identity (IMEI) or mobile equipment identifier (MEI), a universal product code (UPC) number, a global trade item number (GTIN), application identifier (AI) number (e.g., as used within UCC/EAN-128 Symbols), an electronic product code (EPC), a biometric identifier, a globally unique identifier (GUID), an RFID tag, a vehicle identification number (VIN), a point-of-sale (POS) or transaction identifier, a passport number, a library of congress control number, a license plate number, an international standard musical work code (ISWC), a global location number, an international product serial number, an international standard recording code, an electronic serial number, a payment card number (e.g., as may be found on credit cards, debit cards, stored-value cards, gift cards, etc.), a bank identifier code (also known as a SWIFT code), a routing transit number (RTN), an arbitrary account number (e.g., token), a shipment tracking number, a global release identifier (GRID), a digital object identifier (DOI), a lot number, a time stamp, a social security number, a driver's license number, a recycling code, or the like or any combination thereof.

Recycling codes that may be conveyed by the payload field 112 (or linked to via the payload field 112) include one or more codes identifying recyclable or otherwise reprocessable plastics (e.g., 1 for polyethylene terephthalate, 2 for high-density polyethylene, 3 for polyvinyl chloride, etc.), identifying recyclable or otherwise reprocessable batteries (e.g., 8 for lead-acid batteries, 12 for lithium batteries, etc.), identifying recyclable or otherwise reprocessable paper (e.g., 20 for cardboard, 21 for mixed paper magazines or mail, 23 for paperboard, etc.), identifying recyclable or otherwise reprocessable metals (e.g., 40 for steel, 41 for aluminum, etc.), identifying recyclable or otherwise reprocessable organic material (e.g., 50 for wood, 51 for cork, 60 for cotton, 61 for jute, etc.), identifying recyclable or otherwise reprocessable glass (e.g., 71 for clear glass, 72 for green glass, etc.), identifying recyclable or otherwise reprocessable composites (e.g., 81 for paper/plastic as might be found in consumer packaging, disposable plates, etc., 84 for paper/cardboard/plastic/aluminum as might be found in juice boxes, gum wrappers, etc., etc.), or the like or any combination thereof.

Some examples of other types of information that may be conveyed (or linked to) include a date, a name, an address, a location, labeling information (e.g., associated with a CPG, consumer electronic device, home appliance, textile product, etc.), information used by a manufacturer, packer, distributor, etc., of a CPG, consumer electronic device, home appliance, textile product, etc.) to internally track or identify a CPG, consumer electronic device, home appliance, textile product, etc.), a recipe, advertising or promotional information, or the like or any combination thereof.

Numerous types of dates may be conveyed by the payload field 112 (or linked to via the payload field 112). Some examples of types of dates that may be conveyed (or linked to) include a "sell by" date, a "best if used by" date, a "use by" date, an expiration date, a date of manufacture, a publication date, copyright date, a shipment date, or the like or any combination thereof.

Numerous types of names may be conveyed by the payload field 112 (or linked to via the payload field 112). Some examples of types of names that may be conveyed (or linked to) include a name of an entity such as a person, manufacturer, packager, distributor, service provider, advertiser, producer, artist, company, etc., a name of a brand, trademark, product, service, event, or the like or any combination thereof.

Numerous types of addresses or locations may be conveyed by the payload field 112 (or linked to via the payload field 112). Some examples of types of addresses or locations that may be conveyed (or linked to) include a street address or GPS location of an entity such as a person, manufacturer, packager, distributor, service provider, advertiser, producer, artist, company, etc., an IP address associated with the aforementioned entity or with a brand, product, service, or event, or the like or any combination thereof.

Numerous types of labeling information may be conveyed by the payload field 112 (or linked to via the payload field 112), and may vary depending upon various factors associated with the message itself, the host media signal, the media associated with the host media signal, any object or event associated with the media, or the like or any combination thereof. For example, if the message conveying the payload field 112 is associated with an object such as a CPG (e.g., a food, drug, cosmetic or medical device), the types of labeling information that may be conveyed or linked to may include the net quantity of the contents of the CPG (e.g., in terms of weight, measure, numerical count, etc.), the identity of the contents of the CPG (e.g., detergent, sponge, etc.), the name and/or place of business of the CPG's manufacturer, packer, distributor, etc., serving size, servings per container, total fat content, saturated fat content, trans fat content, cholesterol content, carbohydrate content, sugar content, dietary fiber content, protein content, gluten content, soy content, identification of a major food allergan (e.g., milk, eggs, fish, crustacean shellfish, tree nuts, peanuts, wheat, soybeans, etc.), name of a food source of a major food allergan, food source of a peanut content, lactose content, certain ingredient information (e.g., the content of certain ingredients such as calcium, potassium, sodium, etc.) the name of an active ingredient, the name of an inactive ingredient, a description of use(s) associated with the CPG (e.g., a symptom or disease that an over-the-counter medicine will treat or prevent), warning(s) associated with the CPG (e.g., when not to use the CPG, conditions that may require advice from a physician before using the CPG, possible interactions or side effects, when to stop using the CPG, when to contact a physician, when to seek guidance from a physician or other professional, keep the CPG out of children's reach, etc.), purpose (e.g., CPG action or category), how to store the CPG, dosage, dosage regimen, dosage administration, or the like or any combination thereof.

It will further be appreciated that the other types of labeling information conveyed by (or linked to via) the payload 112 may include also any information required or recommended by any administrative or regulatory agency (e.g., the United States (US) Food and Drug Administration (FDA), the US Federal Trade Commission (FTC), the US Federal Communications Commission (FCC), or the like or any combination thereof) to be communicated in association with a CPG, consumer electronic device, household appliance, textile product, or the like, or any particular type thereof, or any combination thereof.

If a payload comprises multiple payload items, the payload field 112 can be divided into a corresponding number of payload item fields (e.g., first payload item field 200 and second payload item field 202, as shown in FIG. 2), wherein each payload item field conveys a single payload item. It will be appreciated that bit-length of each payload item field in the payload field 112 may vary depending upon the particular payload item conveyed.

As exemplarily described above, numerous payload items can be characterized as particular types of the same type of payload item. For example, a "sell by" date, "best if used by" date, "use by" date, expiration date, date of manufacture, publication date, copyright date, shipment date, and the like, can all be characterized as particular types of the same payload item type (i.e., "date"). Accordingly, any payload item that can be characterized as a particular type of some payload item type can also hereinafter be generically referred to a sub-type of a payload item (or "payload item sub-type").

It has been discovered that a problem may arise when a payload item conveyed by the payload field 112 corresponds to a payload item sub-type: without a priori knowledge that the payload field 112 conveys a particular payload item sub-type, it may be difficult to accurately interpret what a payload item sub-type (when decoded at a decoder) represents. Accurate interpretation of a decoded payload item sub-type can be further frustrated when different payload item sub-types are represented by bit sequences having the same number of bits, when different payload item sub-types are represented by sequences having the same bit format or syntax, or the like or any combination thereof. For example, the payload field 112 may convey a payload item type (e.g., "date") corresponding to "Jun. 6, 2015". Is Jun. 6, 2015 a "sell by" date? An expiration date? Some other date? Further, if a "sell by" date and an expiration date can each be represented by bit sequences having the same number of bits and/or the same bit format or syntax (e.g., the first M bits in the bit sequence represent the year, the next N bits represent the month, and the next O bits represent the day), it may be difficult to accurately interpret what is represented by "Jun. 6, 2015" represents. Thus, it may be difficult to accurately and reliably discern the semantic meaning of "Jun. 6, 2015".

To address the above-noted problems associated with payload item sub-types, the message 100 can be constructed such that payload field 112 conveys, e.g., as a particular payload item in a payload item field, a payload item sub-type identifier that indicates what a payload item, once decoded, represents. A payload item sub-type identifier can be associated with any particular payload item sub-type and carry one or more payload item sub-type parameters, such as a format of bits or other symbols used to represent the particular payload item sub-type, the syntax of bits or other symbols used to represent the particular payload item sub-type, the semantic meaning of bits or other symbols used to represent the particular payload item sub-type, and/or the location of a payload item field in the payload field 112 conveying the particular payload item sub-type, or an index that refers to one or more or all of these payload item sub-type parameters. The payload item sub-type identifier can be created, selected from among many different existing payload item sub-type identifiers or otherwise set during generation of the message 100.

It will be appreciated that the payload item sub-type identifier need not be associated solely with payload item sub-types, but may be associated with any payload item. Accordingly, interpretation of a decoded payload item conveyed by a payload item field in the payload field 112 can be controlled by reference to the payload item sub-type identifier conveyed in another payload item field of the same payload field 112. By controlling the interpretation of a decoded payload item according to an associated payload item sub-type identifier, the semantic meaning of the payload item can be accurately and reliably discerned. For example, interpretation of the aforementioned decoded payload item (i.e., "Jun. 6, 2015") can be made with reference to an associated payload item sub-type identifier indicating that the decoded payload item actually represents a "best if used by" date.

The payload item sub-type identifier can be created, selected from among many different existing payload item sub-type identifiers or otherwise set during generation of the message 100. Accordingly, a particular version identifier conveyed by the version field 108 can be associated with a set of payload item sub-type identifiers, wherein one of the payload item sub-type identifiers from the set is carried within a payload item field in the payload field 112.

In one embodiment, the location of the payload item field conveying the payload item sub-type identifier can correspond to the associated version identifier conveyed by the version field 108. For example, a payload item sub-type identifier associated with a first version identifier may be conveyed in the first of a sequence of payload item fields whereas a payload item sub-type identifier associated with another version identifier may be conveyed in the second of a sequence of payload item fields. In another embodiment, however, the location of the payload item field conveying the payload item sub-type identifier can remain fixed regardless of the associated version identifier conveyed by the version field 108.

In one embodiment, the number of payload item sub-type identifiers conveyed in the payload field 112 can correspond to the associated version identifier conveyed by the associated version field 108. For example, only one payload item sub-type identifier may be conveyed in a payload field 112 associated with a first version identifier whereas three payload item sub-type identifiers may be conveyed in a payload field 112 associated with another version identifier. In another embodiment, however, the number of payload item sub-type identifiers conveyed in the payload field 112 can remain fixed regardless of the associated version identifier conveyed by the version field 108.

In one embodiment, the payload item sub-type parameters are carried within the payload item sub-type identifier directly. In another embodiment, however, the payload item sub-type identifier is a link through which the payload item sub-type parameters (e.g., stored locally at the decoder, at a remote server, or the like or any combination thereof) are accessible. Instead of a direct link, the payload item sub-type identifier can convey one or more pointers, indexes, or other indirect links to an intermediate database (e.g., accessible locally at the decoder, at a remote server, or the like or any combination thereof), from which a destination link to the payload item sub-type parameters can be obtained (e.g., from a remote server).

In one embodiment, a payload item associated with a payload item sub-type identifier is conveyed in a payload item field that immediately follows the payload item field conveying the payload item sub-type identifier. In another embodiment, a payload item associated with a payload item sub-type identifier is conveyed in a payload item field that immediately precedes the payload item field conveying the payload item sub-type identifier. In yet another embodiment, a payload item associated with a payload item sub-type identifier is conveyed in a payload item field that follows or precedes the payload item field conveying the payload item sub-type identifier, but is separated therefrom by an intervening payload item field.

In one embodiment, the payload item sub-type identifier is associated with a payload item conveyed by only one payload item field. In another embodiment, however, the payload item sub-type identifier can be associated with payload items conveyed by multiple payload item fields.

Figure 3:
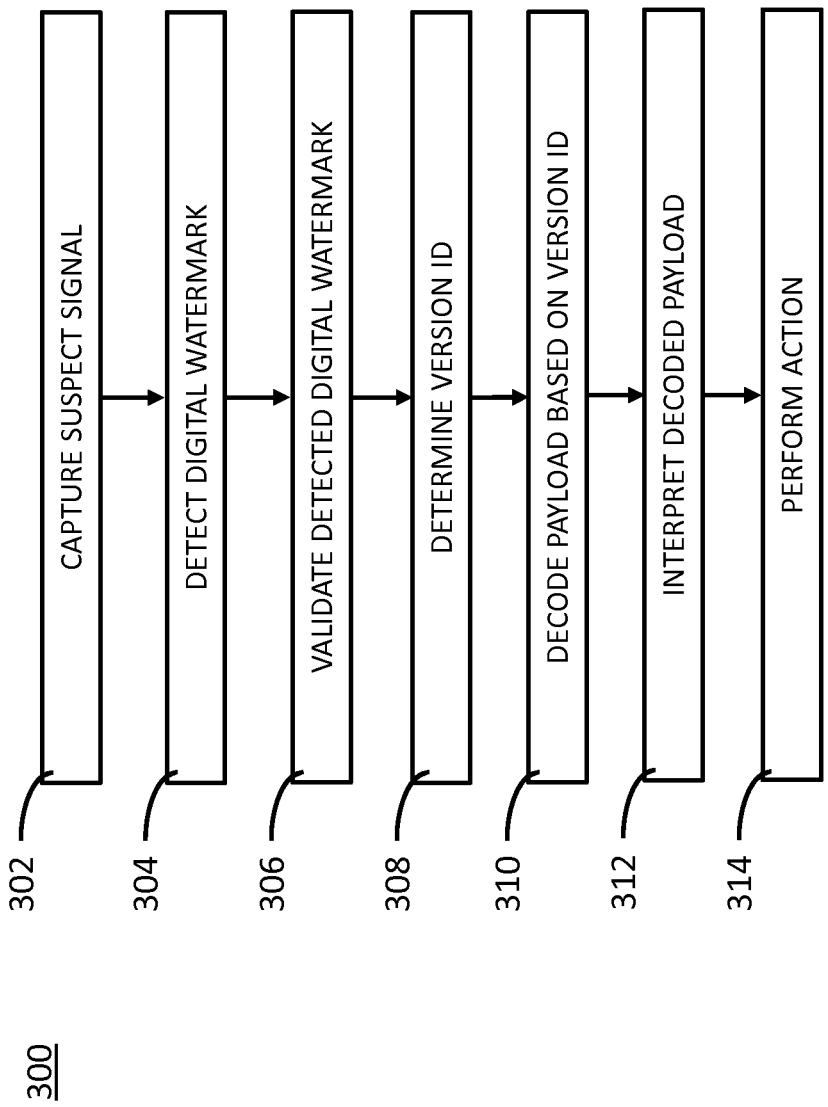
FIG. 3 is a flow chart illustrating a watermark extraction process according to one embodiment.
Figure 4:
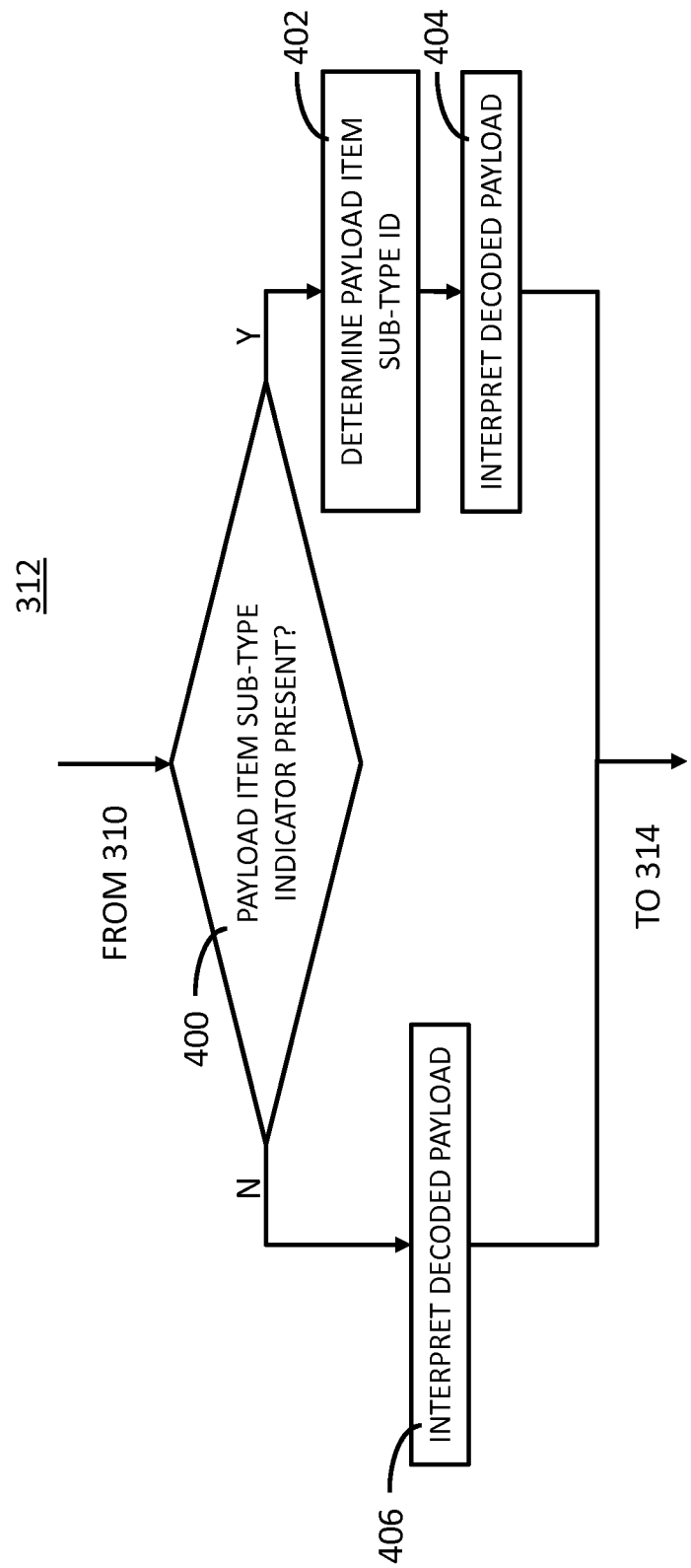
FIG. 4 is a flow chart illustrating a process of interpreting a decoded payload according to one embodiment of the watermark extraction process shown in FIG. 3.

FIG. 3 is a flow chart illustrating a watermark extraction process according to one embodiment. This process, labeled here as process 300, can be implemented using a suitably-configured camera-equipped electronic device (e.g., a smartphone) having software instructions stored thereon that, when executed by a processor (e.g., a computer processor, etc.) associated with the device, cause the device to function as a watermark decoder configured to perform the exemplary watermark decoding process described below. FIG. 4 is a flow chart illustrating a process of interpreting a decoded payload according to one embodiment of the watermark extraction process shown in FIG. 3.

Referring to FIG. 3, a signal (i.e., a suspect signal) suspected of carrying a digital watermark conveying a message, such as message 100 described above with respect to FIGS. 1 and 2, is first captured (302) using, for example, a camera or other image sensor coupled to or otherwise associated with the device. Next, the captured suspect signal is processed to detect the presence of an encoded digital watermark (304). Exemplary techniques that may be used to detect digital watermarks are described in U.S. Pat. Nos. 6,614,914, 6,625,297, and 6,975,745, each of which is incorporated herein by reference.

Upon detecting a digital watermark, the host media signal is processed to determine whether or not the detected digital watermark signal is a valid watermark signal (306). Watermark validation is performed by decoding the embedded watermark according to a protocol key corresponding to the protocol by which the digital watermark was encoded into the host media signal. The protocol key may be stored locally at the device on which the decoder is implemented, stored remotely (e.g., at a remote server accessible by the device), or the like or any combination thereof. Watermark validation can entail accumulation of decoded repeated message symbols, followed by error correction decoding. The result of the error correction decoding includes the aforementioned set of false positive symbols and version identifier. The decoded set of false positive symbols is then compared with a known set of false positive symbols and, if the comparison indicates a match, then the watermark is determined to be valid.

In one embodiment, the digital watermark may be encoded in the host media signal according to one of many protocols. In such an embodiment, a plurality of protocol keys may be stored within a look-up table (e.g., found locally at the device, or otherwise accessible to the device at a remote server). In the event that a set of false positive symbols, decoded using one protocol key, does not match a known set of false positives, then the embedded watermark may be re-decoded according to another protocol key accessed from the look-up table. This process may be repeated until a decoded set of false positives matches a known set of false positive symbols.

Once validated, the message 100 is processed to determine the version identifier that is carried within the version field 108 (308). In one embodiment, the decoder can interpret the version identifier to access one or more of the aforementioned version parameters. As mentioned above, the version parameters may be carried within the version identifier directly or may be accessed via a look-up operation (e.g., using the version identifier as an index).

Once determined, the version parameters corresponding to the determined version identifier is used to decode the variable message portion 104 (310). In one embodiment, decoding of the variable message portion 104 can entail accumulation of repeated message symbols within the variable message portion 104, followed by error correction decoding specified by the error correction type identifier carried by the version identifier. The result of the decoding includes the error detect symbols carried by the error detect field 110, as well as other message symbols carried by the payload field 112. To confirm the accuracy with which the payload field 112 is decoded, the decoder may apply an error detection method to the payload field 112 and compare results of the error detection method with the error detect symbols. If results of the error detection method match the error detect symbols, then the payload field 112 is determined to have been decoded accurately.

Upon decoding the payload field 112, the decoded payload can be read or otherwise interpreted to determine what the decoded payload represents (i.e., to discern the semantic meaning of the decoded payload) (312). In one embodiment, the manner in which decoded payload is interpreted can vary depending upon the version identifier determined at 308. For example, and with reference to FIG. 4, the decoder may determine, based on version parameter(s) carried by the version identifier, whether a payload item sub-type indicator is present (or whether a payload item sub-type indicator indicates the presence of one or more payload item sub-type identifiers) (400). If a payload item sub-type indicator is present (or if the payload item sub-type indicator indicates that one or more payload item sub-type identifiers are conveyed by the payload field 112), the decoder reads the decoded payload field 112 (or one or more portions thereof) to determine the payload item sub-type identifier carried therein (402). Thereafter, the decoded payload item conveyed by each payload item field associated with a respective payload item sub-type identifier determined at 402 (as well as any decoded payload item conveyed by each payload item field not associated with a payload item sub-type identifier) is interpreted (404). However, if no payload item sub-type indicator is present (or if the payload item sub-type indicator indicates that no payload item sub-type identifiers are conveyed by the payload field 112), the decoder reads the decoded payload field 112 (406).

Referring back to FIG. 3, after the payload is decoded and interpreted, the decoder can perform an action (318). In one embodiment, the action to be performed may include rendering the decoded payload (e.g., visually, via sound, via vibration, etc.) at an output device (e.g., a display, a loudspeaker, a haptic actuator, etc.) coupled to, or otherwise associated with, the decoder. In another embodiment, the action to be performed may include transmitting (e.g., via any suitable wired or wireless communications medium) the decoded payload. In one embodiment, the decoded payload is transmitted to a remote server, which uses the decoded payload to perform a database search or other data look-up. The results of the data look-up can provide content or object identification (a number or some other form of index for metadata lookup), which in turn, can enable look-up of metadata corresponding to the content or object identification in one or more metadata databases. The metadata can then be returned to a device (not shown) for output (e.g., visual, audio, haptic, or the like or any combination thereof) or for further processing. In one embodiment, metadata is returned to the device that transmitted the decoded payload. In another embodiment, the metadata is returned to some other device (e.g., a user's home device, a monitoring system's data collection database in which metadata is aggregated and compiled for electronic report generation, a device coupled to or otherwise associated with the decoder, etc.).

More on the Extraction Process

Selective Payload Decoding/Interpreting

According to the process described above with respect to FIGS. 3 and 4, software instructions associated with a device implement a decoder that decodes and interprets the entire payload field 112. In another embodiment, however, the software instructions associated with the device implement a decoder that (by reference to the version identifier carried by the message 100) decodes and interprets only a portion of the payload field 112, or that decodes the entire payload field 112 but interprets only a portion of the decoded payload field 112. Thus different devices, each having different software instructions stored thereon, can be configured to decode and/or interpret different portions of the same payload field 112. The different portions may overlap or may be mutually exclusive of one another. The ability to control which portion(s) of the payload field 112 is(are) decoded by a particular device can be desirable in some circumstances (e.g., when a digital watermark encoded in a host media signal is expected to be detected and/or read by decoder associated with different entities and/or to be read for different purposes).

For example, consider a message that is to be conveyed in a digital watermark encoded in a label affixed to an object such as a consumer packaged good (CPG) (e.g., a box of cereal such as WHEATIES). The payload associated with such a message may include a product identifier (e.g., a GTIN) associated with the CPG, a recycling code (e.g., 23, indicating the CPG is made of paperboard), as well as other information such as indicating where the CPG was manufactured/assembled, a "best if used by date" (e.g., Jun. 6, 2015), a recipe (e.g., for cereal-encrusted chicken strips). Instead of conveying each payload item of this exemplary payload directly, the message can convey one or more direct links (e.g., or address, or IP address, etc.) to one or more remote servers where one or more items of the payload are stored and can be obtained. Alternatively, the message can convey one or more pointers, indexes, or other indirect links to an intermediate database (e.g., accessible on a remote server), from which a destination link to one or more of the items of the payload can be obtained.

In the example message provided above, a device associated with the manufacturer of the CPG (e.g., GENERAL MILLS) may be provided with software instructions configured to implement a detector that is capable of decoding all of the payload items (i.e., the product identifier, the recycling code, the location of manufacture/assembly, the "best if used by" date , and the recipe). (Indeed, the manufacturer of the CPG may have constructed the message, embedded the message in the CPG label, or may have contracted with a $3^{rd}$ party to construct or embed the message in the CPG label.)

A device (e.g., a point-of-sale (POS) optical scanner) associated with a retail seller of the CPG (e.g., a grocery store), however, may be provided with software instructions configured to implement a detector that is capable of decoding and interpreting only a specific portion of the payload field 112 at corresponding to a payload item field carrying the product identifier, or that is otherwise capable of decoding the entire payload field 112 but capable of interpreting only the specific portion of the payload field 112 at corresponding to a payload item field carrying the product identifier. Once decoded and interpreted, the product identifier can be used by the retail seller to facilitate identification of the consumer packaged good (CPG) in a retail check-out setting. Similarly, another device (e.g., an inventory scanner) associated with the retail seller of the CPG may be provided with software instructions configured to implement a detector that is ultimately capable of interpreting only the portion of the payload corresponding to the "best if used by" date. Once interpreted, the "best if used by" date can be used by a stock clerk to facilitate arrangement of the CPG on a store shelf (e.g., so as to increase the likelihood that a consumer will buy the particular CPG before the "best if used by" date passes), to determine whether or not a particular CPG is associated with a product recall, etc.

Further, a device (e.g., a smartphone) associated with a consumer of the CPG may be provided with software instructions configured to implement a detector that is ultimately capable of interpreting only the portion of the payload corresponding to the "best if used by" date and the recipe. Once interpreted, the "best if used by" date can be used by the consumer to determine whether or not to buy the particular CPG or consume the contents of the CPG, to determine whether or not a particular CPG is associated with a product recall, etc. In another embodiment, the device associated with a consumer of the CPG may not be able to ultimately interpreted only the portion of the payload corresponding to the recipe (or any other advertising or promotional information) until the consumer has downloaded specific software instructions (e.g., from the manufacturer of the CPG) configured to implement a detector having specific functionality onto the device.

Further still, a camera-equipped device associated with a waste sorting apparatus may be provided with software instructions configured to implement a detector that is capable of decoding only the portion of the payload corresponding to the recycle code. Once decoded, the recycle code can be used by a recycling or other waste management facility to facilitate sorting of incoming material streams.

Further Modifications to Watermark Extraction Process

According to the process described above with respect to FIG. 3, software instructions associated with a device implement a decoder that determines a payload item sub-type identifier conveyed by the payload field 112 whenever a payload item sub-type indicator is present (or if a payload item sub-type indicator indicates that one or more payload item sub-type identifiers are conveyed by the payload field 112). In another embodiment, however, software instructions associated with a device can implement a decoder that reads and interprets one or more payload item fields without first reading a payload item field conveying a payload item sub-type identifier. In yet another embodiment, software instructions associated with a device can implement a decoder that performs an action at 314 based on one or more decoded portions of the payload field 112 without interpreting the decoded payload at 312. In such alternative embodiments, the software instructions associated with a device implement a decoder configured to operate on the premise that the payload field 112 (or a particular payload item field therein) conveys a particular payload item (e.g., based simply on the version identifier determined at 308).

Additional Description

In another embodiment, we create a variable payload structures where bits within pre-defined numeric ranges are treated differently. For example, bits within a certain numeric range can be treated as one identifier, and beyond that range, some or all of the bits could be treated as a different identifier. As a concrete example, a 14-digit GTIN code can be accommodated within 47 bits. There is headroom within the 47 bits to also carry an additional 8-digit identifier—numbers beyond the maximum 14-digit number can be treated as the 8-digit identifier (e.g., by subtracting the maximum 14-digit number from these larger numbers).

Concluding Remarks

Having described and illustrated the principles of our inventive work with reference to illustrative examples, it will be recognized that the technology is not so limited.

For example, while the detailed embodiments contemplated that the host media signal is encoded with a single digital watermark, this need not be the case. For example, a host media signal can be encoded with multiple digital watermarks carrying the same payload, or different payloads. The host media signal can carry two or more digital watermarks simultaneously (e.g., in the case of a host media signal provided as a still image, video, audio, etc.) or sequentially in a time-varying manner (e.g., in the case of a host media signal provided as video or audio).

In another example, while the detailed embodiments contemplated that the payload was conveyed by a digital watermark encoded in a host media signal, it will be appreciated that the payload can be conveyed by any other suitable or desirable steganographic technique, by any suitable or desirable signal technique not involving watermarking or steganography, and/or by any suitable data structure other than digital watermark (e.g., any data structure conveyed by a beacon such as iBeacon, 1-D bar code, 2-D bar code, data glyph, etc). Examples of such alternative signaling techniques may include overt signaling techniques using technologies such as Bluetooth, Bluetooth Low Energy, Wi-Fi, ZigBee, Li-Fi, or the like or any combination thereof.

Similarly, while reference was made to app software on a smartphone that performs certain of the detailed functionality, in other embodiments these functions can naturally be performed otherwise—including by operating system software on the smartphone, by a server at a social networking service, by another smartphone or computer device, distributed between such devices, etc.

While reference has been made to smartphones, it will be recognized that this technology finds utility with all manner of devices—both portable and fixed. Tablets, laptop computers, digital cameras, optical scanners such as used in point-of-sale transactions, wrist- and head-mounted systems and other wearable devices, servers, etc., can all make use of the principles detailed herein. (The term "smartphone" should be construed herein to encompass all such devices, even those that are not telephones.)

Particularly contemplated smartphones include the Apple iPhone 5; smartphones following Google's Android specification (e.g., the Galaxy S4 phone, manufactured by Samsung, and the Google Moto X phone, made by Motorola), and Windows 8 mobile phones (e.g., the Nokia Lumia 1020, which features a 41 megapixel camera).

Details of the Apple iPhone, including its touch interface, are provided in Apple's published patent application 20080174570.

The design of smartphones and other computers referenced in this disclosure is familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, a 3-axis gyroscope, one or more microphones, etc., together with software instructions for providing a graphical user interface), interconnections between these elements (e.g., buses), and an interface for communicating with other devices (which may be wireless, such as GSM, 3G, 4G, CDMA, WiFi, WiMax, Zigbee or Bluetooth, and/or wired, such as through an Ethernet local area network, etc.).

The processes and system components detailed in this specification may be implemented as instructions for computing devices, including general purpose processor instructions for a variety of programmable processors, including microprocessors (e.g., the Intel Atom, the ARM A5, the Qualcomm Snapdragon, and the nVidia Tegra 4; the latter includes a CPU, a GPU, and nVidia's Chimera computational photography architecture), graphics processing units (GPUs, such as the nVidia Tegra APX 2600, and the Adreno 330—part of the Qualcomm Snapdragon processor), and digital signal processors (e.g., the Texas Instruments TMS320 and OMAP series devices), etc. These instructions may be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of data may also be distributed among different processor and memory devices. As noted, cloud computing resources can be used as well. References to "processors," "modules" or "components" should be understood to refer to functionality, rather than requiring a particular form of implementation.

Software instructions for implementing the detailed functionality can be authored by artisans without undue experimentation from the descriptions provided herein, e.g., written in C, C++, Visual Basic, Java, Python, Tcl, Perl, Scheme, Ruby, etc., in conjunction with associated data. Smartphones and other devices according to certain implementations of the present technology can include software modules for performing the different functions and acts.

Known browser software, communications software, imaging software, and media processing software can be adapted for use in implementing the present technology.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. For example, in a system in which a smartphone communicates with a computer at a remote location, different tasks can be performed exclusively by one device or the other, or execution can be distributed between the devices. Extraction of fingerprint and watermark data from content is one example of a process that can be distributed in such fashion. Thus, it should be understood that description of an operation as being performed by a particular device (e.g., a smartphone) is not limiting but exemplary; performance of the operation by another device (e.g., a remote server), or shared between devices, is also expressly contemplated.

In like fashion, description of data being stored on a particular device is also exemplary; data can be stored anywhere: local device, remote device, in the cloud, distributed, etc.

As indicated, the present technology can be used in connection with wearable computing systems, including headworn devices. Such devices typically include one or more sensors (e.g., microphone(s), camera(s), accelerometers(s), etc.), and display technology by which computer information can be viewed by the user—either overlaid on the scene in front of the user (sometimes termed augmented reality), or blocking that scene (sometimes termed virtual reality), or simply in the user's peripheral vision. A headworn device may further include sensors for detecting electrical or magnetic activity from or near the face and scalp, such as EEG and EMG, and myoelectric signals—sometimes termed Brain Computer Interfaces, or BCIs. (A simple example of a BCI is the Mindwave Mobile product by NeuroSky, Inc.) Exemplary wearable technology is detailed in patent documents U.S. Pat. No. 7,397,607, 20100045869, 20090322671, 20090244097 and 20050195128. Commercial offerings, in addition to the Google Glass product, include the Vuzix Smart Glasses M100, Wrap 1200AR, and Star 1200XL systems. An upcoming alternative is augmented reality contact lenses. Such technology is detailed, e.g., in patent document 20090189830 and in Parviz, Augmented Reality in a Contact Lens, IEEE Spectrum, September, 2009. Some or all such devices may communicate, e.g., wirelessly, with other computing devices (carried by the user or otherwise), or they can include self-contained processing capability. Likewise, they may incorporate other features known from existing smart phones and patent documents, including electronic compass, accelerometers, gyroscopes, camera(s), projector(s), GPS, etc.

Embodiments of the present technology can also employ neuromorphic processing techniques (sometimes termed "machine learning," "deep learning," or "neural network technology"). As is familiar to artisans, such processors employ large arrays of neuron-like elements—interconnected to mimic biological synapses. Such processors employ programming that is different than the traditional, von Neumann, model. In particular, connections between the circuit elements are weighted according to correlations in data that the processor has previously learned (or been taught). When a pattern of data (e.g., a set of audio, image or other sensor data) is applied to the processor (i.e., to inputs of several of the circuit elements), certain nodes may spike while others remain relatively idle. Each of these nodes may serve as an input to plural other circuit elements, triggering further spiking in certain other nodes—a chain reaction that ultimately provides signals to output nodes to indicate the results of the neuromorphic processing. (In addition to providing output signals responsive to the input data, this process can also serve to alter the weightings, training the network to better respond to certain patterns that it has seen (i.e., processed) before.) Such techniques are well suited for pattern recognition applications, among many others.

Additional information on such techniques is detailed in the Wikipedia articles on "Machine Learning," "Deep Learning," and "Neural Network Technology," as well as in Le et al, Building High-Level Features Using Large Scale Unsupervised Learning, arXiv preprint arXiv: 1112.6209 (2011), and Coates et al, Deep Learning with COTS HPC Systems, Proceedings of the 30th International Conference on Machine Learning (ICML-13), 2013. These journal papers, and then-current versions of the "Machine Learning" and "Neural Network Technology" articles, are attached as appendices to patent application Ser. No. 14/449,821, filed Aug. 1, 2014, now U.S. Pat. No. 9,594,983.

Various references were made to context. The artisan will understand that context refers to any information useful in characterizing the situation of an entity (an entity being a person, place or object that is considered relevant to an interaction between a user and an application, including the user and application themselves).

Context information can be of many sorts, including computing context (network connectivity, resource availability, processor type, CPU contention, etc.), user context (user profile, location, actions, preferences, nearby friends, social network(s) and situation, etc.), physical context (e.g., lighting, noise level, traffic, sensed sounds including speech, etc.), temporal context (time of day, day, month, season, etc.), history of the above, etc.

Another taxonomy of context progresses from simple and concrete, to complex and abstract, starting with location, then physical context (as determined by sensors, e.g., device orientation and motion, temperature, infrared, video, 3D ambient audio, ultrasonic, humidity, gases and other chemical), then actions (e.g., writing, talking, reading, searching, navigating, pointing), then proximities (e.g., to people, vehicles, buildings, perimeters, jurisdictions), then somatic (e.g., live datastreams of biometric information), then data feeds (e.g., subscriptions and RSS feeds, social network follows, alerts and updates), then emergent live data (e.g., from external sources, such as calls, text, email, weather forecasts), and finally n-dimensional context history—encompassing some or all of the foregoing.

Context arrangements suitable for use with the present technology are further detailed in the documents incorporated by reference.

While many of the illustrative embodiments made reference to digital watermarking for content identification, in most instances fingerprint-based content identification (i.e., recognition of inherent, rather than added, patterns) can be used instead.

The techniques of digital watermarking are presumed to be familiar to the artisan. Examples are detailed, e.g., in Digimarc's patent documents U.S. Pat. Nos. 6,614,914, 6,590,996, 6,122,403, 20100150434, 20110274310, 2014-0052555, and 2015-0016664. Spot colors, as are commonly found on packaging, can be watermarked by leaving tiny voids in the printing to subtly change the luminance or chrominance. Other techniques for watermarking of spot colors are detailed in U.S. Pat. No. 6,763,124 and application Ser. No. 13/975,919, filed Aug. 26, 2013, now issued as U.S. Pat. No. 9,449,357.

Fingerprint-based content identification techniques are also well known. SIFT, SURF, ORB and CONGAS are some of the most popular algorithms. (SIFT, SURF and ORB are each implemented in the popular OpenCV software library, e.g., version 2.3.1. CONGAS is used by Google Goggles for that product's image recognition service, and is detailed, e.g., in Neven et al, "Image Recognition with an Adiabatic Quantum Computer I. Mapping to Quadratic Unconstrained Binary Optimization," Arxiv preprint arXiv: 0804.4457, 2008.)

Still other fingerprinting techniques are detailed in patent publications 20090282025, 20060104598, WO2012004626 and WO2012156774 (all by LTU Technologies of France).

Yet other fingerprinting techniques are variously known as Bag of Features, or Bag of Words, methods. Such methods extract local features from patches of an image (e.g., SIFT points), and automatically cluster the features into N groups (e.g., 168 groups)—each corresponding to a prototypical local feature. A vector of occurrence counts of each of the groups (i.e., a histogram) is then determined, and serves as a reference signature for the image. To determine if a query image matches the reference image, local features are again extracted from patches of the image, and assigned to one of the earlier-defined N-groups (e.g., based on a distance measure from the corresponding prototypical local features). A vector occurrence count is again made, and checked for correlation with the reference signature. Further information is detailed, e.g., in Nowak, et al, Sampling strategies for bag-of-features image classification, Computer Vision-ECCV 2006, Springer Berlin Heidelberg, pp. 490-503; and Fei-Fei et al, A Bayesian Hierarchical Model for Learning Natural Scene Categories, IEEE Conference on Computer Vision and Pattern Recognition, 2005; and references cited in such papers.

Optical character recognition (OCR) can be similarly employed to identify objects, and can also serve to provide anchor points to which annotations may be spatially referenced.

Use of such identification technologies to obtain object-related metadata is familiar to artisans and is detailed, e.g., in the assignee's patent publication 20070156726, as well as in publications 20120008821 (Videosurf), 20110289532 (Vobile), 20110264700 (Microsoft), 20110125735 (Google), 20100211794 and 20090285492 (both Yahoo!).

Linking from watermarks (or other identifiers) to corresponding online payoffs or payloads is detailed, e.g., in Digimarc's U.S. Pat. Nos. 6,947,571 and 7,206,820.

Applicant's other work that is relevant to the present technology includes that detailed in published application nos.: 20100228632, 20110212717, 20110214044, 20110161076, 20120284012, 20120218444, 20120046071, 20120300974, 20120224743, 20120214515, 20130097630, 20130311329, 20130314541, 2014-0258110, 2014-0164124, 2015-0016712; and U.S. Pat. No. 8,868,039.

This specification has discussed several different embodiments. It should be understood that the methods, elements and concepts detailed in connection with one embodiment can be combined with the methods, elements and concepts detailed in connection with other embodiments. While some such arrangements have been particularly described, many have not—due to the large number of permutations and combinations. Applicants similarly recognize and intend that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting several of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

The present specification should be read in the context of the cited references. (The reader is presumed to be familiar with such prior work.) Those references disclose technologies and teachings that the applicant intends be incorporated into embodiments of the present technology, and into which the technologies and teachings detailed herein be incorporated.

To provide a comprehensive disclosure, while complying with the statutory requirement of conciseness, applicant incorporates-by-reference each of the documents referenced herein. (Such materials are incorporated in their entireties, even if cited above in connection with specific of their teachings.) These references disclose technologies and teachings that can be incorporated into the arrangements detailed herein, and into which the technologies and teachings detailed herein can be incorporated. The reader is presumed to be familiar with such prior work.

The claims submitted with this application address just a small fraction of the patentable inventions disclosed herein. Applicant expects many more, and broader, claims will be issued from this patent family.

In view of the wide variety of embodiments to which the principles and features discussed above can be applied, it should be apparent that the detailed embodiments are illustrative only, and should not be taken as limiting the scope of the invention. Rather, applicant claims as the invention all such modifications as may come within the scope and spirit of the following claims and equivalents thereof.

What is claimed is:

1. A method for creating a payload in a data structure, comprising:
    forming a fixed message portion comprising a validation field and a version field, in which the validation field and the version field each have a fixed bit-length, in which the validation field comprises a fixed set of message symbols that provide a check to determine whether a valid payload is present, in which the version field comprises a version identifier indicating a version associated with a variable message portion;
    forming the variable message portion comprising an error detect field and a payload field, in which the error detect field comprises a plurality of error detect symbols, and in which the payload field comprises a payload item sub-type identifier that identifies a payload item conveyed in the payload field; and
    embedding the fixed message portion and the variable message portion into a host media signal.

2. The method of claim 1, wherein the data structure comprises a digital watermark.

3. The method of claim 1, wherein said embedding comprises embedding such that the data structure is substantially imperceptible in the host media signal.

4. The method of claim 1, wherein the payload item comprises at least one item selected from the group of: an identifier, a computer file, a set of machine-executable instructions, metadata, a date, a name, an address, and a location.

5. The method of claim 1, wherein the version identifier includes a global trade item number (GTIN), an application identifier (AI), or a recycling code.

6. A method for interpreting a data structure comprising a message, the message comprising a fixed message portion and a variable message portion, the method comprising:
    processing the fixed message portion to determine a version of the variable message portion, said processing yielding a determined version of the variable message portion, in which the variable message portion comprises a payload item sub-type identifier that identifies a sub-category associated with a payload item conveyed in a payload field;
    decoding the payload field of the variable message portion according to the determined version of the variable message portion; and
    interpreting the decoded payload field according to the payload item sub-type identifier.

7. The method of claim 1 in which the payload item comprises a sell-by date or expiration date.

8. The method of claim 1 in which the payload item sub-type identifier comprises plural bits.

9. The method of claim 1 in which the version identifier conveys a location of the payload item sub-type identifier within the variable message portion.

10. The method of claim 1 in which a location of the payload item sub-type identifier is independent of data conveyed by the version identifier.

11. The method of claim 1 in which the variable message portion comprises a plurality of payload item sub-type identifiers.

12. The method of claim 11 in which the version field conveys a number of the plurality of payload item sub-type identifiers.

13. The method of claim 1 in which the payload item sub-type identifier identifies the payload item by conveying a sub-category associated with the payload item.

14. The method of claim 1 in which the payload item sub-type identifier identifies the payload item by conveying a sub-category associated with the version identifier.

15. The method of claim 6 in which the payload item comprises a sell-by date or expiration date.

16. The method of claim 6 in which the payload item sub-type identifier comprises plural bits.

17. The method of claim 6 in which the determined version comprises plural bits and indicates a location of the payload item sub-type identifier within the variable message portion.

18. The method of claim 6 in which a location of the payload item sub-type identifier is independent of data conveyed by the determined version.

19. The method of claim 6 in which the variable message portion comprises a plurality of payload item sub-type identifiers.

20. The method of claim 19 in which the determined version comprises plural bits, and conveys a number of the plurality of payload item sub-type identifiers.

21. The method of claim 6 in which the payload item sub-type identifier identifies the payload item by conveying a sub-category associated with the payload item.

22. The method of claim 6 in which the payload item sub-type identifier identifies the payload item by conveying a sub-category associated with the determined version.

* * * * *